R. H. SMITH.
METHOD OF MANUFACTURING THUMB NUTS.
APPLICATION FILED OCT. 15, 1909.

948,616.  
Patented Feb. 8, 1910.  
3 SHEETS—SHEET 1.

Witnesses  
E. B. Fletcher  
H. R. Sullivan

Inventor  
Roy H. Smith  
By Thurston & Woodward  
attys.

R. H. SMITH.
METHOD OF MANUFACTURING THUMB NUTS.
APPLICATION FILED OCT. 15, 1906.
948,616.
Patented Feb. 8, 1910.
3 SHEETS—SHEET 2.
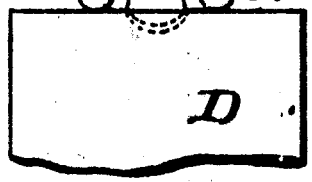
Fig. 9.
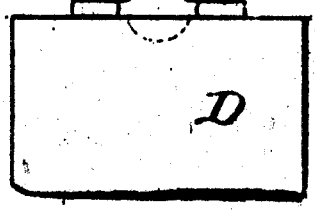
Fig. 10.
Fig. 11.
Fig. 12.
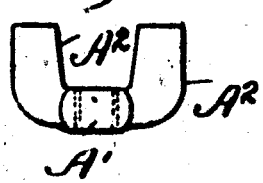
Witnesses
E. B. Gilchrist
H. R. Sullivan.
Inventor
Roy H. Smith
by
Thurston Bradford
attys.

UNITED STATES PATENT OFFICE.

ROY H. SMITH, OF CLEVELAND, OHIO.

METHOD OF MANUFACTURING THUMB-NUTS.

948,616.  Specification of Letters Patent.  Patented Feb. 8, 1910.

Application filed October 15, 1908. Serial No. 457,795.

*To all whom it may concern:*

Be it known that I, Roy H. Smith, a citizen of the United States, residing at Cleveland, in the county of Cuyahoga and State of Ohio, have invented a certain new and useful Improvement in Methods of Manufacturing Thumb-Nuts, of which the following is a full, clear, and exact description.

The present invention is directed to an improvement in the production of thumb nuts.

Figure 1:
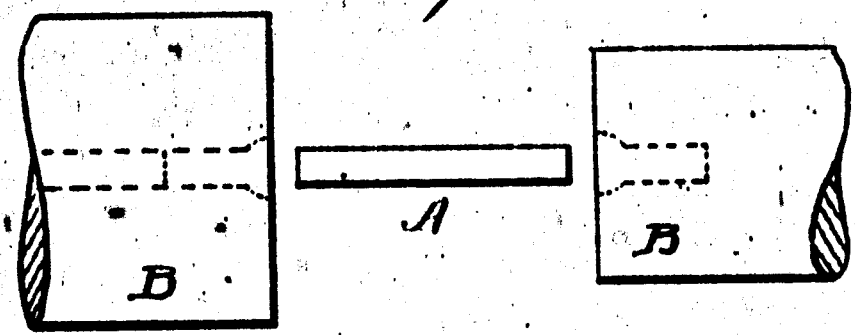
Figure 2:
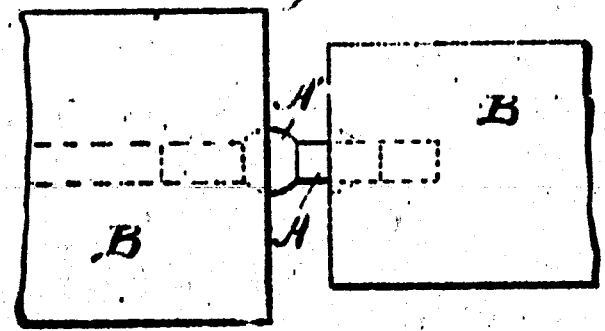
Figure 3:
Figure 4:
Figure 5:
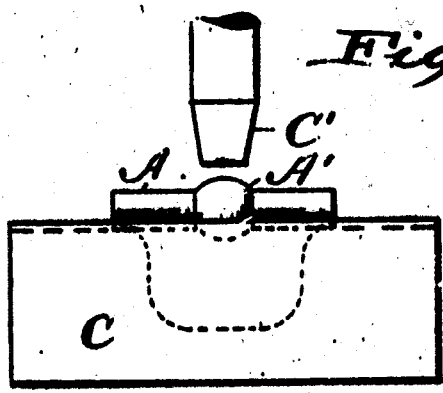
Figure 6:
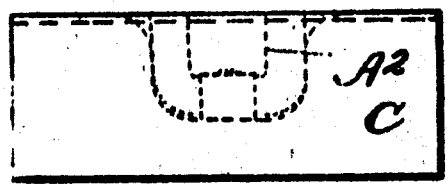
Figure 7:
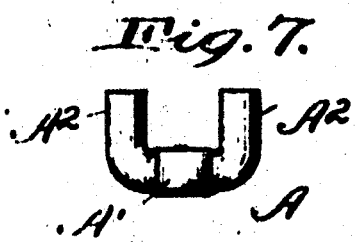
Figure 8:

More particularly my invention is directed to the production of thumb nuts by a method whereby they may be made with great rapidity from excellent material and without the introduction of any structural weakness by reason of such rapid operation. The ordinary methods of manufacturing thumb nuts are well-known, and it is also well-known that the methods in common use which produce good nuts of good material are slow and expensive, as for example, the drop forging method, and the other and cheaper methods do not produce satisfactory nuts. It will be seen, however, that I have obtained the objects which I have above recited from the method disclosed in the following specification with reference to the accompanying drawings, in which:

Figure 1 is an elevation illustrating the first relation of the apparatus in work in the first step of my process. Fig. 2 is an elevation illustrating the completion of the first step, and Figs. 3 and 4 are respectively side and end elevations illustrating the product of the first step. Fig. 5 is a side elevation showing the position of the apparatus in the work immediately prior to the second step of my process, and Fig. 6 is an elevation of the die used in the second step showing the work therein in dotted lines after the completion of the second step. Figs. 7 and 8 are respectively a side elevation and plan view of the work after the second step has been completed. Figs. 9 and 10 are side elevations, respectively showing the position of the apparatus and the work before and after the third operation. Figs. 11 and 12 are respectively top plan and side elevations of the work after the completion of the third operation, but shown with an opening tapped therethrough.

In carrying out my process I prefer to make use of drawn steel wire, since the quality of this material produces an excellent character of nut. The wire is cut into short lengths A having the required weight of metal therein for the product produced by the three operations of my process, which length is inserted between heavy dies B, B suitably shaped to compress the wire endwise and expand it at its central portion, producing a spherical enlargement A' at that point. The product of this first operation is thus a rod shorter than the original length of bar section with an enlargement in the central portion thereof, which enlargement I prefer to have substantially the diameter of the desired nut. This first product is then placed upon a die C having a cavity therein shaped to bend the two end portions A² of the blank laterally and in the same direction, and in forcing this blank into the die I make use of a hammer C' of suitable shape and dimension, driving the central enlargement A' of the blank to the bottom of the die cavity and preferably flattening it somewhat on the top and bottom, as shown in Figs. 6 and 7. This step produces a blank having a central enlargement of approximately the diameter of the desired nut with vertically extended cylindrical wings A² at each side thereof, as shown in Figs. 7 and 8. This blank I then place between flattening hammer heads D, D which have cavities therein to receive the central enlarged portion and hold it to proper dimension, but the faces of these hammer heads flatten the cylindrical projecting wings so that they spread and take on the form of the ordinary wing desired in thumb nuts.

The product will be a blank of the form shown in Figs. 11 and 12 except, of course, it will not have the thread tapped therein, as shown in these figures. There may, of course, be some modifications given to the shape of the dies in order to produce slightly modified forms of nut or wings, but the steps above disclosed and the forms of apparatus illustrated for carrying out these steps, fully demonstrate the principle underlying my invention.

It will be evident to one skilled in the art, that the production of nut blanks by this method may be carried on at an exceedingly rapid rate with the utilization of the best steel wire for that purpose, if desired, and I would direct attention particularly to the fact that inasmuch as the fiber of the wire parallels the length thereof, such operations as those which I carry out do not have any tendency to fracture the wire and cause the nut to split open during its manufacture, the several steps and dies being especially suitable for the handling of just such material.

As an alternative for the first step in my process it is possible to start with a rod section of the same diameter which it is desired that the central portion of the blank shall have, and swage the two end portions down to a less diameter, arriving at the same product as that produced by the first step in the process above described. The subsequent steps of the process would be the same as above outlined. Of course, in following this alternative of the first step, a section of shorter length would be used, the swaging necessarily lengthening the rod somewhat while reducing the diameter of the swaged portion.

Having thus described my invention, I claim:

1. The method of producing nut blanks comprising heading a wire section intermediate its ends, bending the end portions laterally and in the same direction, and flattening said end portions.

2. The method of producing nut blanks comprising heading a short rod intermediate its ends, flattening the enlarged head and bending said end sections laterally in the same direction, and flattening said bent end sections.

3. The method of manufacturing nut blanks comprising the steps of producing in a wire section a relative enlargement of the central portion in comparison with the end portions, bending the end portions laterally and flattening them.

In testimony whereof, I hereunto affix my signature in the presence of two witnesses.

ROY H. SMITH.

Witnesses:
J. M. WOODWARD,
H. R. SULLIVAN.